United States Patent [19]
Iguchi

[11] Patent Number: 5,979,741
[45] Date of Patent: Nov. 9, 1999

[54] DEVICE FOR GAS PRESSURE WELDING

[76] Inventor: Hirohito Iguchi, 3-46, Hizaori-machi 2-chome, Asaka-shi, Saitama, Japan

[21] Appl. No.: 08/979,825

[22] Filed: Nov. 24, 1997

[30] Foreign Application Priority Data

| Nov. 28, 1996 | [JP] | Japan | 8-332801 |
| May 8, 1997 | [JP] | Japan | 9-134281 |
| May 26, 1997 | [JP] | Japan | 9-151628 |

[51] Int. Cl.[6] .................................................. B23K 37/00
[52] U.S. Cl. ...................................... 228/44.3; 228/234.1
[58] Field of Search ............................... 228/DIG. 902, 228/44.3, 51, 196, 9, 44.1, 234.1, 218; 126/237, 405, 406

[56] References Cited

U.S. PATENT DOCUMENTS

| 2,260,342 | 6/1941 | Scott | 158/27.4 |
| 3,954,216 | 5/1976 | Eberle | 282/51 |
| 4,103,815 | 8/1978 | Yokokawa et al. | 228/9 |
| 4,121,748 | 10/1978 | Yokokawa et al. | 228/102 |
| 4,570,551 | 2/1986 | Derbidge et al. | 110/263 |
| 4,576,324 | 3/1986 | Takimoto et al. | 228/44.3 |
| 4,927,357 | 5/1990 | Yap | 432/22 |
| 5,222,654 | 6/1993 | Oki et al. | 228/220 |
| 5,472,143 | 12/1995 | Bartels et al. | 239/462 |
| 5,509,600 | 4/1996 | Okada et al. | 228/205 |

*Primary Examiner*—Patrick Ryan
*Assistant Examiner*—Kiley Stoner
*Attorney, Agent, or Firm*—Oliff & Berridge, PLC

[57] ABSTRACT

A three dimensional flame nozzle on which at least four conduits stand upright. Each conduit has at least upper and lower nozzle tips. The angles of each nozzle tip can be adjusted so that a flame blown from each nozzle tip intersects with the flame blown from a corresponding nozzle tip to form a three dimensional flame having a number-sign shape that is steady and focused near the central portion of reinforcement steel. A nozzle supporting fixture has a first hold fitting to firmly hold and release the reinforcing steel at one end of a nearly L-shaped nozzle supporting fixture and a second hold fitting to firmly hold and release a three-dimensional nozzle at the other end of the L-shaped nozzle supporting fixture.

10 Claims, 8 Drawing Sheets

DEVICE FOR GAS PRESSURE WELDING

BACKGROUND OF THE INVENTION

1. Field of Invention

The present invention relates to flame nozzles of a device for gas pressure welding which heats reinforcing steel with oxy-acetylene flames, welds by applying pressure, and accessories that support and hold the nozzles.

2. Description of Related Art

In general, when a piece of reinforcing steel is welded to another piece of reinforcing steel, the connection has been accomplished using a device for gas pressure welding to insure sufficient strength of the connection joint. The gas pressure welding is carried out by abutting the end faces of each piece of reinforcing steel to be processed for welding together, and the abutting point is welded by heating while pressure is applied to the joint face. The nozzle used for the heating is configured to blow a combustion gas, such as acetylene gas. The tip of the nozzle is usually formed on a bifurcate conduit and the combustion flames from the tip hits along the radial direction of the reinforcing steel so that the flames heat a whole circumference of the reinforcing steel.

In the conventional nozzle, a conduit is formed in a curve, such as a ring-shape or a U-shape, so that the conduit surrounds the circumference of the reinforcing steel to be welded. The tips of the nozzle are arranged on the wall of the conduit so that flames blow out toward the central portion which is surrounded by the conduit. When the reinforcing steel to be welded is placed in the central portion of the conduit, plural nozzle tips are arranged in an equal angle along the periphery of the reinforcing steel so that the flames from the nozzle tips uniformly overlays the whole circumference of the weld point on the reinforcing steel. The number of the nozzle tips formed on the conduit is usually 4, 6, 8, . . . or 12 and the nozzle tips are arranged to uniformly heat the whole circumference of the reinforcing steel.

However, in the conventional gas pressure welding device, since the conduit on which the nozzles are provided and the nozzle tips are arranged is on a common plane, the plane formed by the flame blown out from the nozzles coincides with a cross section of the reinforcing steel. Accordingly, although the conventional nozzles can specifically heat the circumference of a cross section of the reinforcing steel along a line, the conventional nozzles can not heat a range of area broader than a certain width. Therefore, in the conventional gas pressure welding device, it is necessary to constantly swing the nozzles between a certain area along the axial direction of the reinforcing steel. Accordingly, a gas weld worker has to swing the conduit with nozzles along the axial direction of the reinforcing steel with his hand while he manages to position the reinforcing steel at the central portion. Thus his work always requires tension, and has a disadvantage that if the welder misses his target area, oxygen comes in to make oxidation in a flash, which will disqualify the weld during inspection.

When gas pressure welding reinforcing steel, workers must pay attention to various aspects of the heating work in which they are engaged. For example, workers must carefully prepare before starting the heating work, such as inspecting the end portions of the reinforcing steel for cracks and bends which yield damaging defects on the pressure welded spot, as well as inspecting the gas pressure welding device and its accessories, treating and processing of the end face of the reinforcing steel to be pressure welded, and installation of a pressurizing machine. Another aspect to pay attention to is the temperature and weather of the job site at the time when the work is carried out, because such factors as high temperature, cold temperature, strong wind, and rain or snow can also affect the job from the safety standpoint since the workers are handling high pressure oxygen and acetylene gases. Therefore it is an industry regulation that a gas pressure welding operation be carried out under the control of a qualified person. Therefore, the development of a flame nozzle which ensures secure welding work has been necessitated because the slight amount of carelessness can affect the quality the finished job on a large scale.

SUMMARY OF THE INVENTION

A first object of the present invention is to provide a device for gas pressure welding which is able to uniformly cover the whole circumference of a weld portion with flames when nozzles of the device are fixed around the pressure, portion of the reinforcing steel to be welded and is able to pressure weld without having to oscillate the nozzle along the axial direction of the reinforcing steel.

It is a second object of the present invention to provide a device suitable for automatic gas pressure welding.

It is a third object to provide a device for gas pressure welding where a rate of defect incidence at the weld point is extremely low. A fourth object of the present invention is to provide a device for gas pressure welding which is able to follow any variation in size of the reinforcing steel and is capable of pressure welding reinforcing steel having a large diameter.

Moreover, it is a further object of the present invention to provide a device for gas pressure welding which gives careful consideration not to damage the nozzle from the heat generated during the gas welding.

To achieve the above described objects, the present invention has a structure where nozzles are placed at the lattice points of a constructively formed cube in which the portion of the reinforcing steel to be gas pressure welded is placed in the center. The nozzles are symmetrically placed along the cube such that each nozzle of a corresponding pair of nozzles faces the other nozzle and the jet holes of the nozzles are arranged such that the center lines of the flame from each corresponding pair of nozzles are parallel, so that the center of the reinforcing steel is between each pair of corresponding nozzles for heating the portion of the reinforcing steel to be gas pressure welded. That is, the present invention is not a device for gas pressure welding where the nozzles are arranged on a single plane, as in the case of the conventional ring type or U-shape type device, but the heating means in the present invention provides at least four conduits along the four parallel sides of the constrictively formed cube, wherein at least two nozzle tips are provided at upper and lower portions of each conduit; the angles of each nozzle tip are adjusted in a manner such that the flame from each tip focuses on a central portion of the reinforcement steel with some offset so that the flame from each nozzle of a pair of nozzles does not collide with the flame from the other nozzle of the same pair of nozzles. Thus the invention completely eliminates the necessity to swing the nozzle along the axial direction of the reinforcing steel while welding. The nozzles are fixed to the reinforcing steel in a detachable manner so that a worker can perform the heating work with his hand clear of the nozzle. With this structure, the present invention enables the device to be an automatic gas pressure welding device. In such a case, the invention omits the swing process from the conventional devices, which results in the reduction of work time and stablizes the heating process.

BRIEF DESCRIPTION OF THE DRAWINGS

FIG. 11 is a schematic diagram of a perspective view of a nozzles supporting fixture in use;

FIG. 12 is a side view showing a modification of the nozzle supporting fixture.

DETAILED DESCRIPTION OF PREFERRED EMBODIMENT(S)

Preferred embodiments of the present invention will now be described with reference to the drawings.

Figure 1:
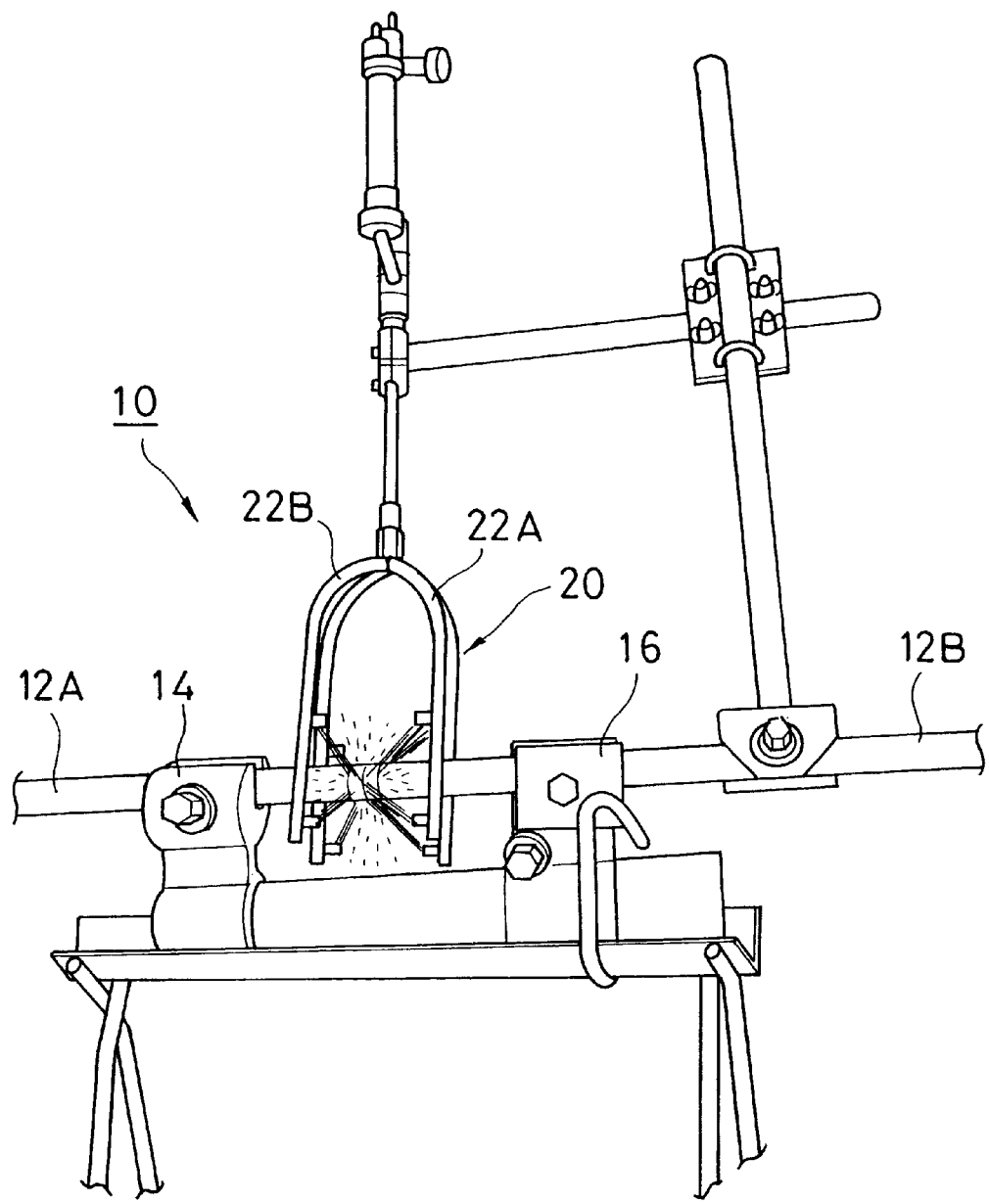
FIG. 1 is a perspective view of a device for gas pressure welling in use relating to an embodiment.

FIG. 1 shows a working state of a device for gas pressure welding 10 reinforcing steel relating to a first embodiment of the present invention. As shown in FIG. 1, the device for gas pressure welding 10 is used to abut the end faces of two pieces of reinforcing steel 12A and 12B, and to heat the abutting portion with gas flames for welding while the two pieces of reinforcing steel 12A and 12B are being pushed toward each other in the axial direction. The end faces of each piece of reinforcing steel 12A and 12B are treated and processed in advance and are held by a pair of clamps 14 and 16 which makes for the close contact of the reinforcing steel 12A and 12B by pressure created by a driving force from hydraulic drive means (not shown) which drives the clamps 14 and 16 toward each other. A gas welding site 18 is placed in the middle by the clamps 14 and 16 where means 20 for heating the welding site by gas combustion flames is arranged.

Figure 2:
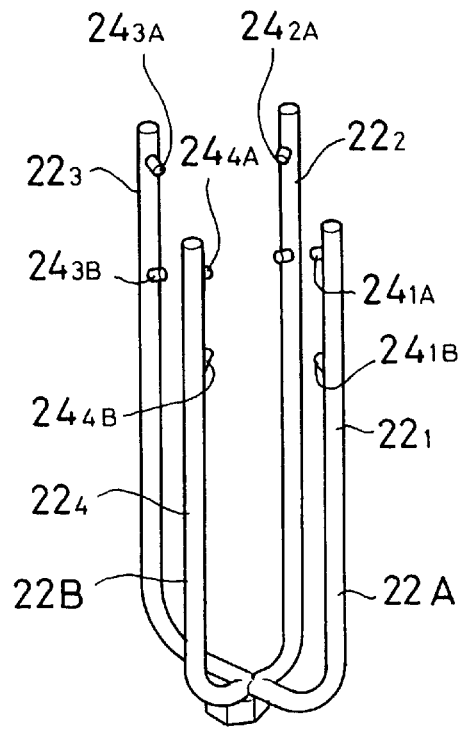
FIG. 2 is a perspective view of a main body of a nozzle of the device for gas pressure welding relating to a first embodiment.
Figure 3:
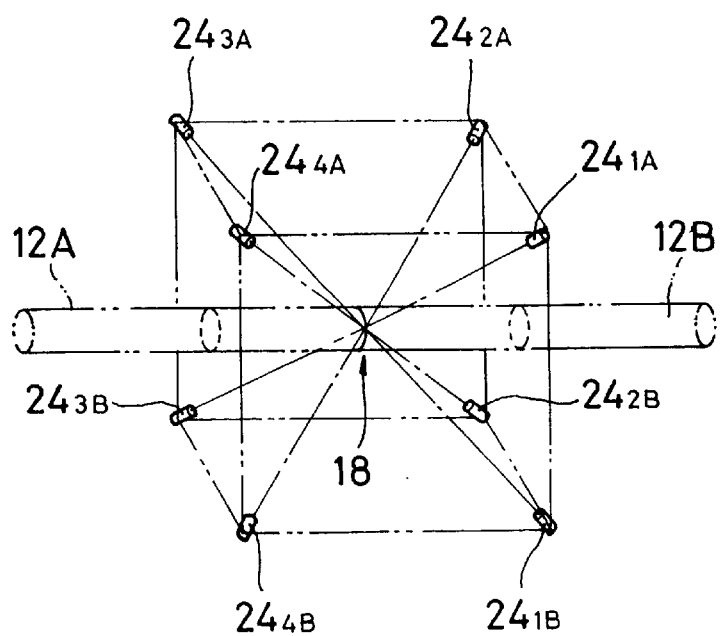
FIG. 3 is an explanatory view showing the arrangement of the nozzle tips to constructively form a cube.

As shown in FIG. 2, the heating means 20 has U-shaped conduits 22A and 22B made of bent hollow pipes such that each conduit 22A and 22B forms a pair of parallel portions similar to the shape of a tuning fork and the heating means 20 forms an integrated main conduit body 22 by intersecting the base portions of the two bent conduits 22A and 22B in a shape of a cross and connecting at the intersection. Therefore, the main body of the conduit 22 has four parallel conduit portions $22_1$, $22_2$, $22_3$, and $22_4$. Each parallel conduit portion $22_1$, $22_2$, $22_3$, and $22_4$ has nozzle tips $24_{1A-4A}$ and $24_{1B-4B}$ which are provided at the upper and lower positions leaving a space between the two positions on each conduit $22_1$, $22_2$, $22_3$, and $22_4$. A subscript A for the nozzle tips on the end side of each conduit and a subscript B for the nozzle tips on the base side of each conduit for distinguishing the conduits are shown. The end side nozzle tips $24_{1A}$, $24_{2A}$, $24_{3A}$, and $24_{4A}$ are arranged to be positioned on a top surface plane and the base side nozzle tips $24_{1B}$, $24_{2B}$, $24_{3B}$ and $24_{4B}$ are arranged to be positioned on a bottom surface plane, as shown in FIG. 3.

Therefore, the heating means 20 is assumed to constructively form a cube composed of six planes using the four parallel conduits $22_1$, $22_2$, $22_3$, arid $22_4$. The top surface plane is formed by the end side nozzle tips $24_{1A}$, $24_{2A}$, $24_{3A}$, and $24_{4A}$ and the bottom surface plane is formed by the base side nozzle tips $24_{1B}$, $24_{2B}$, $24_{3B}$, and $24_{4B}$. The heating means 20 is configured to have the nozzle tips 24 ($24_{1A}$, $24_{2A}$, $24_{3A}$, $24_{4A}$ and $24_{1B}$, $24_{2B}$, $24_{3B}$, and $24_{4B}$) at the lattice points of the constructively formed cube. The parallel conduit portions $22_1$, $22_2$, $22_3$, and $22_4$ correspond to the parallel four side planes of the constructively formed cube.

The flame nozzle tips $24_{1A-4A}$ and $24_{1B-4B}$ thus arranged are placed so that they can blow a flame toward the central portion (body center) of the constructively formed cube. The pairs of the nozzle tips $24_{1A}$ and $24_{3B}$, $24_{2A}$ and $24_{4B}$, $24_{4A}$ and $24_{2B}$ are symmetrically positioned around the cube so that each nozzle tip of a pair of nozzle tips faces the other nozzle top of the same pair of nozzle tips so that they heat the gas pressure weld portion 18 of the reinforcing steel 12A, 12B placed at the above described central portion with a flame (see FIG. 1).

Figure 4A:
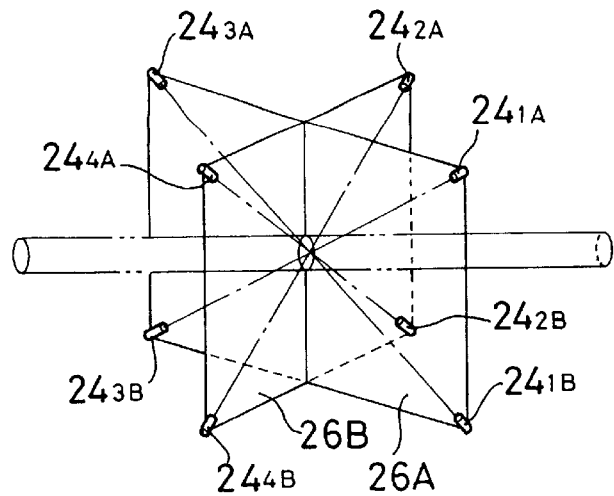
FIG. 4A is a perspective view showing the direction of the flames from the nozzle tips and the relation between the planes formed by pairs of nozzles intersecting at right angles and the nozzle tips, which form center lines of the flame.
Figure 4B:
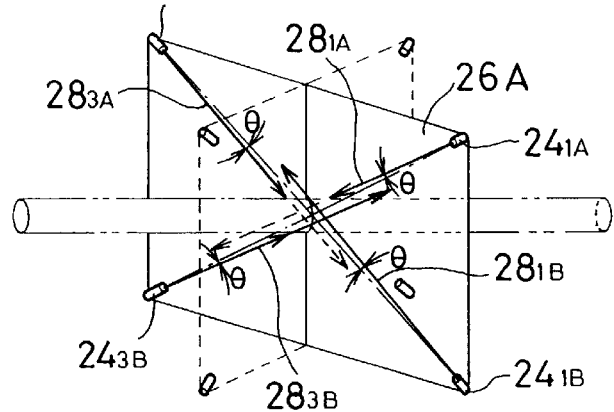
FIG. 4B is a schematic diagram of a perspective view of a number-sign shaped flame formed by direction of the flame center lines from the nozzle tips on one plane.
Figure 4C:
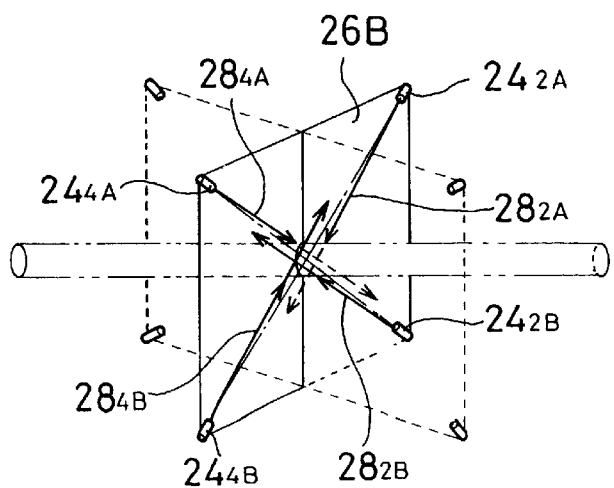
FIG. 4C is a view of another number-sign shaped flame formed by the direction of the flame center lines on another plane.

A plane 26A on which the nozzle tips ($24_{1A}$ and $24_{3B}$), and ($24_{3A}$ and $24_{1B}$) of the U-shaped conduit 22A are arranged, and another plane 26B on which the nozzle tips ($24_{2A}$ and $24_{4B}$), and ($24_{4A}$ and $24_{2B}$) of the U-shaped conduit 22B are intersectingly arranged with each other at right angles at the weld portion 18 of the reinforcing steel 12A, 12B to be gas pressure welded as shown in FIG. 4A. Each nozzle tip of a corresponding pair of nozzle tips faces the other nozzle tip forming a pair on each plane 26A and 26B that faces each other on a line that is nearly coincident with the direction along the diagonal line of each plane, but in the present invention, as shown in FIG. 4B and FIG. 4C, the flame center lines from a each corresponding pair of the nozzle tips are arranged not to coincide on the same line but to intersect in a number-sign shape at the pressure weld portion 18 of the reinforcing steel 12A and 12B. It will be explained more specifically with reference to FIG. 4B. Center lines $28_{1A}$ and $28_{3B}$ of the flames which are blown out from the nozzle tips ($24_{1A}$ and $24_{3B}$) placed at a pair of comer portions on the plane 26A, are directed toward the central direction of the plane (or the center of the pressure weld portion 18 of the reinforcing steel) at the angles θ degree to the diagonal lines. At this time, the flame from the upper nozzle tip $24_{1A}$ is arranged to direct toward at least between the center of the reinforcing steel 12B and a tangential line of the upper outer surface of the reinforcing steel 12A, and the flame from the lower nozzle tip $24_{3B}$ is arranged to direct toward between the center of the reinforcing steel 12A and a tangential line of the bottom outer surface of the reinforcing steel 12B.

Similarly, another pair of the nozzle tips ($24_{3A}$ and $24_{1B}$) are arranged to direct toward the central direction of the plane (or the center of the pressure weld portion 18 of the reinforcing steel) at the angles θ degree to the diagonal lines. The flame from the upper nozzle tip $24_{3A}$ is arranged to direct toward at least between the center of the reinforcing steel 12A and a tangential line of the upper outer surface of the reinforcing steel 12B, and the flame from the lower nozzle tip $24_{1B}$ is arranged to direct toward between the center of the reinforcing steel 12B and a tangential line of the bottom outer surface of the reinforcing steel 12A. Accordingly, the center lines of the flames $28_{1B}$ and $28_{3A}$ are arranged to direct toward the central direction of the plane (or the center of the pressure weld portion 18 of the reinforcing steel) at the angles θ to the diagonal lines. By this arrangement, the flames from the four nozzle tips $24_{1A}$ and $24_{3B}$, and $24_{3A}$ and $24_{1B}$, do not intersect at the center of the pressure weld portion 18 of the reinforcing steel, but are directed along the diagonal lines of a predetermined concentric circle. Thus the flames are arranged in a number-sign shape to carry out the heating. The same arrangement is taken in the plane 26B side, and as shown in FIG. 4C, in the flame from the nozzle tips ($24_{2A}$ and $24_{4B}$), and ($24_{4A}$ and $24_{2B}$), the flame center lines $28_{2A}$, $28_{4B}$, $28_{4A}$, and $28_{2B}$ do not intersect each other at the pressure weld portion 18 of the reinforcing steel 12A and 12B, and consequently, the flames are arranged in a number-sign shape to carry out the heating.

In the device for gas pressure welding of the embodiment, as shown in FIG. 1, the reinforcing steel 12A and 12B are abutted, acetylene gas and oxygen are introduced into the main body of the conduit 22 by the above described heating means 20, and the flames for heating the end faces of the weld portion of the reinforcing steel 12A and 12B are blown from the nozzle tips $24_{1A-4A}$ and $24_{1B-4B}$, while the end faces are being kept in a close contact with pressure by pressure applying means. The nozzle tips $24_{1A-4A}$ and $24_{1B-4B}$ are provided on the upper and lower portion of the four parallel conduits $22_1$, $22_2$, $22_3$, and $22_4$ placed in front and behind, right and left of the gas pressure weld portion 18 of the reinforcing steel 12A and 12B, so that they are positioned at the lattice points of constructively formed hexahedron. Number-sign shaped flames are formed by the nozzle tips on one flat plane so that the center lines $28_{1A-4A}$ and $28_{1B-4B}$ of the flames from the at point symmetric positions are deviated from the center of the weld portion 18. The number-sign shaped flames are formed on each intersecting planes 26A and 26B at right angles so that the flames cross each other at the reinforcing steel weld portion 18. Through this arrangement, in the above described device for gas pressure welding, the flames from each nozzle tip $24_{1A-4A}$ and $24_{1B-4B}$ enclose the whole gas pressure weld portion 18, and the heating is quite effectively carried out so that the gas welding can be performed without having to oscillate the heating means 20 along the axial direction of the reinforcing steel 12A and 12B, which is required in the conventional device.

Figure 5:
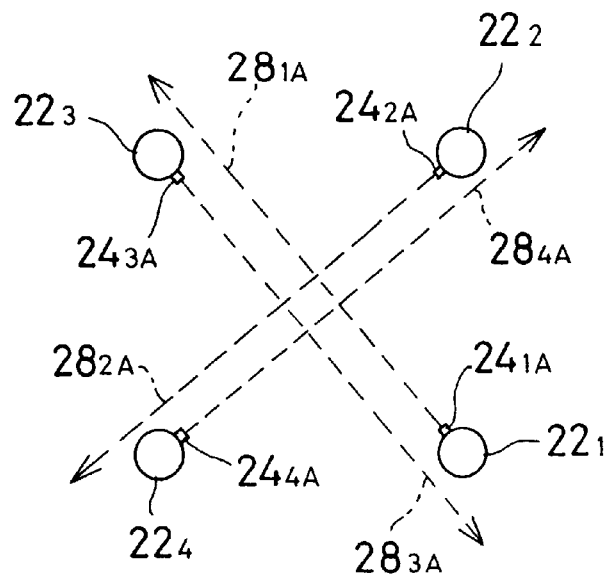
FIG. 5 is a schematic diagram of a perspective view showing at track of flame jetted from the upper stages of the nozzle tips.
Figure 6:
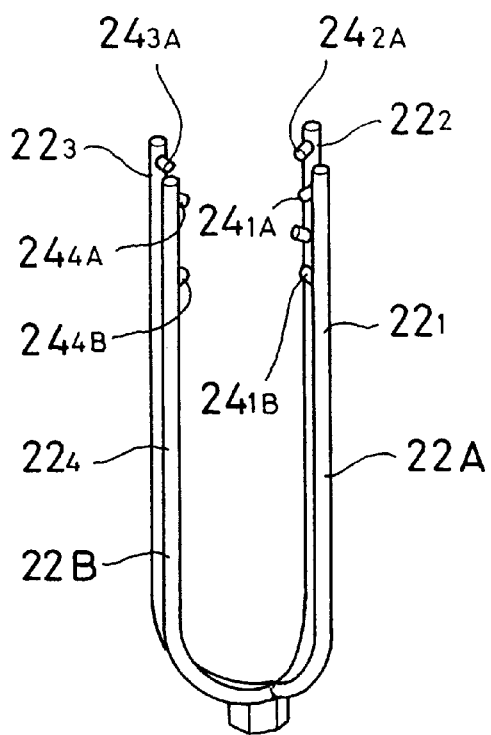
FIG. 6 is a perspective view of a nozzle of the device for gas pressure welding relating to a second embodiment.

It should be noted that the nozzle angles may be adjusted to make the flame lines to be in a number-sign shape in one plane so that the axial center of the paired nozzle tips $24_{1A-4A}$ should not directly hit the confronting parallel conduits $22_1$, $22_2$, $22_3$, $22_4$, and the flames should enclose the reinforcing steel 12A and 12B from the top and bottom side while heating, and also the focus of the flame center lines $28_{1A-4A}$ should be a little off to the sides from the center as shown in FIG. 5. For such purpose, the angle is adjusted in a manner that the focus of the flame center lines $28_{1A}$ and $28_{2A}$, $28_{3A}$ and $28_{4A}$ which are blown out from the upper nozzle tips $24_{1A-4A}$ deviates to the left or right from the center. This is also the same for the focus of the flame center lines from the bottom side $28_{1B}$ and $28_{2B}$, $28_{3B}$ and $28_{4B}$. Therefore, in the present embodiment, it is recommendable that eight nozzle tips $24_{1A-4A}$ and $24_{1B-4B}$ should be arranged on the parallel conduits $22_1$, $22_2$, $22_3$, and $22_4$ standing at the four corner of a plane square, and the nozzle angles should be adjusted to have the flame center lines $28_{1A-4A}$ and $28_{1B-4B}$ three-dimensionally and slightly deviated to the left or right in the axial direction of the reinforcing steel 12A and 12B, but not focused on one point of the steel.

Figure 7:
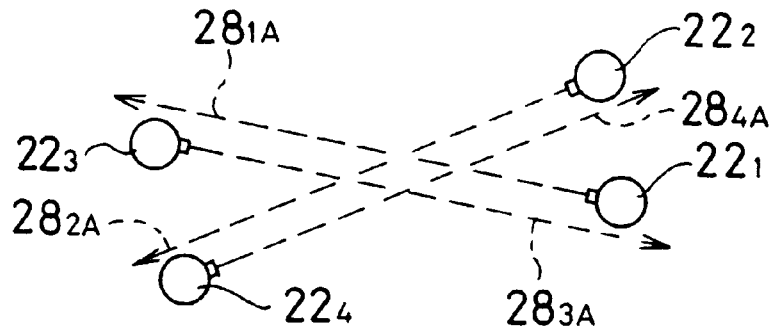
FIG. 7 is a schematic diagram of a perspective view showing a track of flame jetted from the upper stages of the nozzle tips in the second embodiment.

A second embodiment of the present invention will be explained below. As shown in FIG. 7, it is structured that U-shaped conduits 22A and 22B which have nozzle tips $24_{1A-4A}$ and $24_{1B-4B}$ similar to embodiment 1, are crossed in a shape of a flattened, lower case X from vertical directions and parallel conduits $22_1$ $22_2$, $22_3$, and $22_4$ stand upright at the four corners of a rectangle in a plane view. The difference from the first embodiment is this embodiment is easier to use because the flame does not directly hit the facing conduits $22_{1-4}$ in the diagonal line, as shown in FIG. 7, even when all the angles of the nozzle tips $24_{1A-4A}$ and $24_{1B-4B}$ are set, for instance, at an angle of 45°.

Figure 8:
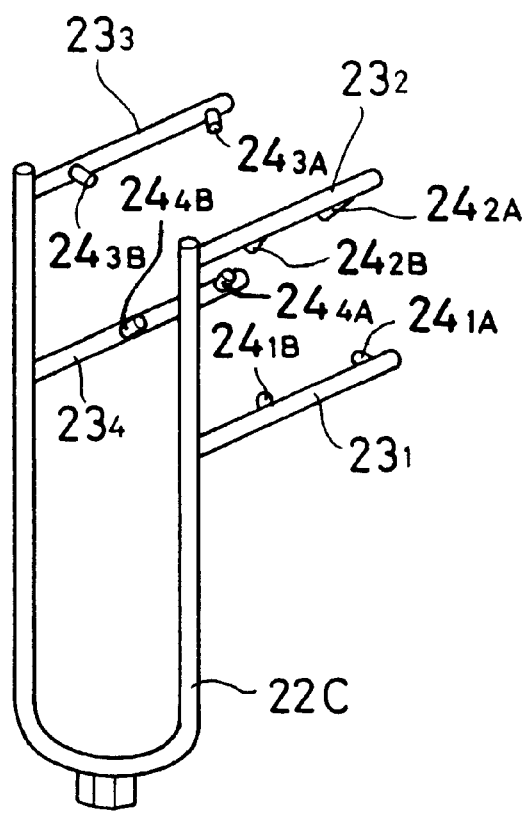
FIG. 8 is a perspective view of a nozzle of the device for gas pressure welding relating to a third embodiment.

Further, a third embodiment of the present invention will be explained with reference to FIG. 8. Branch conduits $23_1$, $23_2$, $23_3$, and $23_4$ having nozzle tips $24_{1A-4A}$ and $24_{1B-4B}$ in two-tier are arranged in a manner that the conduits $23_{1-4}$ stand at the four corners of a rectangle on a U-shaped main conduit 22C (a letter F-shape in a side elevational view), and the nozzle angles are adjusted that the flame center lines ($28_{1A}$, $28_{1B}$, $28_{2A}$, $28_{2B}$, $28_{3A}$, $28_{3B}$, $28_{4A}$, and $28_{4B}$) which are blown out from nozzle tips $24_{1A}$, $24_{1B}$, $24_{2A}$, $24_{2B}$, $24_{3A}$, $24_{3B}$, $24_{4A}$, and $24_{4B}$ provided on each conduit, form a three dimensional number-sign shape so that a focused portion of the flame center lines ($28_{1A}$ and $28_{2A}$) and ($28_{3A}$ and $28_{4A}$) is a little off to the right or left from the center to uniformly heat the area to be oscillated so as to omit the conventional swing process. The focused portion of the flame center lines ($28_{1B}$ and $28_{2B}$) and ($28_{3B}$ and $28_{4B}$) from the bottom side is also similar to the above described condition and thus the flame center line 28 is in a three-dimensional number-sign shape.

Figure 9:
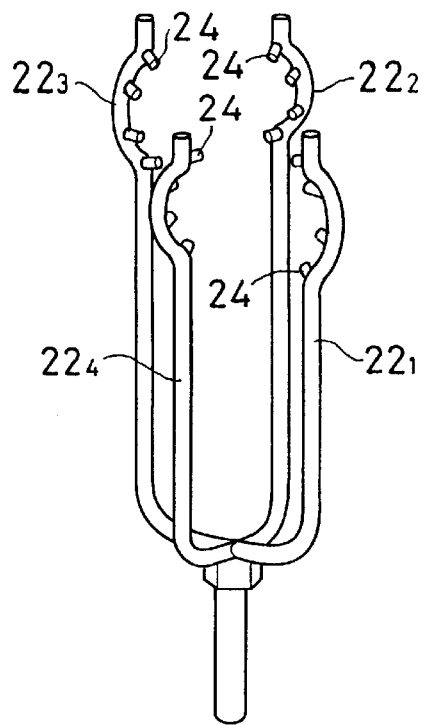
FIG. 9 is a perspective view of a nozzle of the device for gas pressure welding relating to a fourth embodiment.
Figure 10:
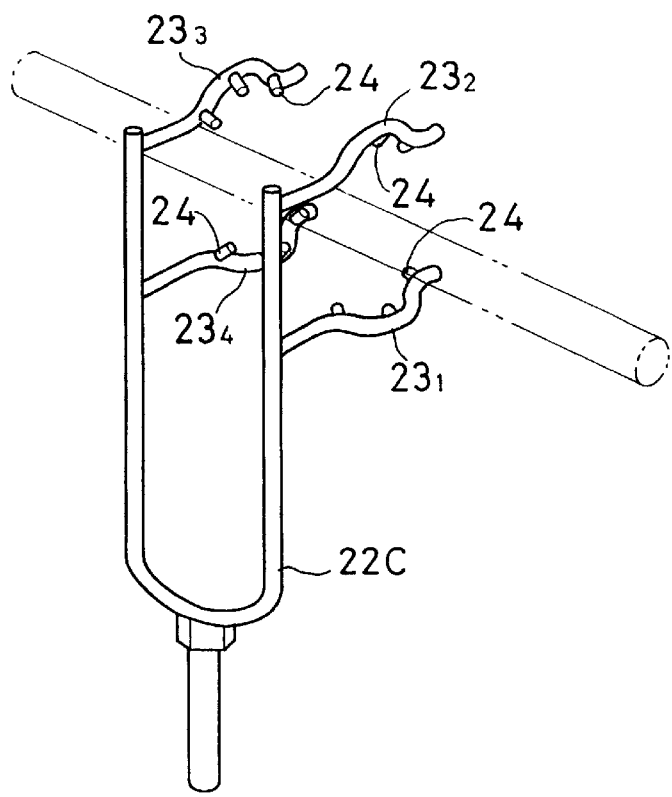
FIG. 10 is a perspective view of a nozzle of the device for gas pressure welding relating to a fifth embodiment.
Figure 1:
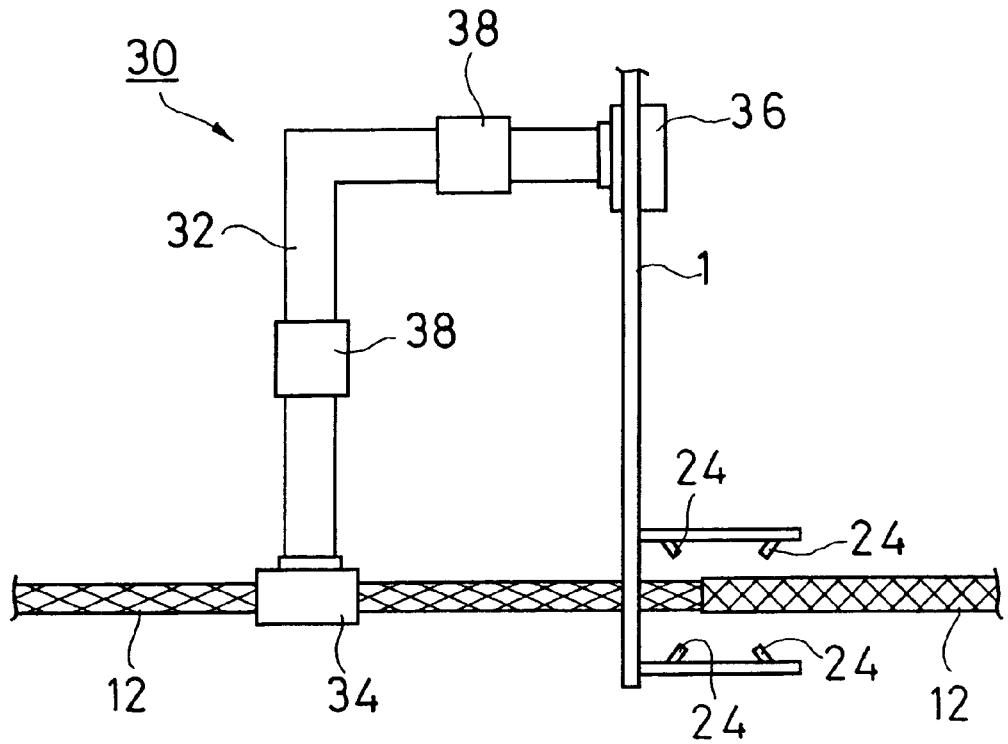
Figure 1:
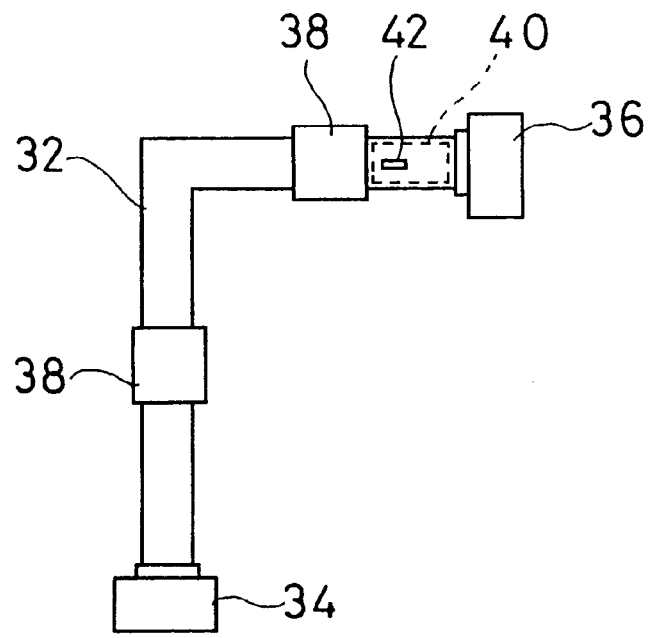

FIGS. 9 and 10 show other embodiments of the invention. Though the conduit portion $22_{1-4}$ for the nozzle tips $24_{1A-4A}$ and $24_{1B-4B}$ is a straight pipe structure in each aforementioned embodiment, examples shown in these figures have curved conduit portions which bend outward in cases when the reinforcing steel to be welded is cylindrical. The FIG. 9 case is a modification of the first embodiment shown in FIG. 2, and the FIG. 10 case is a modification of the third embodiment shown in FIG. 8. These modifications ensure a uniform heating, because every distance from the nozzles 24 to the reinforcing steel 12A and 12B is equal at any place.

Preferred embodiments on nozzle supporting fixture especially for the heating means 20 in the device for gas pressure welding relating to the present invention will be explained below. FIG. 11 shows a metal nozzle supporting fixture 30 to fix the above described heating means 20. The nozzle supporting fixture 30 has a first hold fitting 34 to firmly hold and release the reinforcing steel 12 at an end portion of a nearly L-shaped supporting rod 32. In addition, a second hold fitting 36 to hold and release the heating means 20 is attached at the other end portion. And after the nozzle supporting fixture 30 having the heating means 20 is positioned in a manner that flames mainly heat the end faces of the reinforcing steel 12 to be welded under pressure in the heating work, then it is attached to the reinforcing steel 12. It is convenient to provide a length adjusting portion 38 in the middle of the first hold fitting 34 so that the length can be adjusted in response to the need from the situation such as size and shape condition of the heating means 20 used, the thickness of the reinforcing steel 12 and so forth.

FIG. 12 shows a modification of the nozzle supporting fixture. A vibrator 40 which can be actuated by both alternating current and direct current is attached near the setting portion of the flame nozzle first hold fitting 34 on the metal nozzle supporting fixture 30. By turning a switch 42 on, the nozzle 24 is slightly vibrated and the flame blown out from the nozzle 24 goes to-and-fro on the gas pressure weld portion 18 so that the welding can be uniformly achieved without irregularity.

Figure 13:
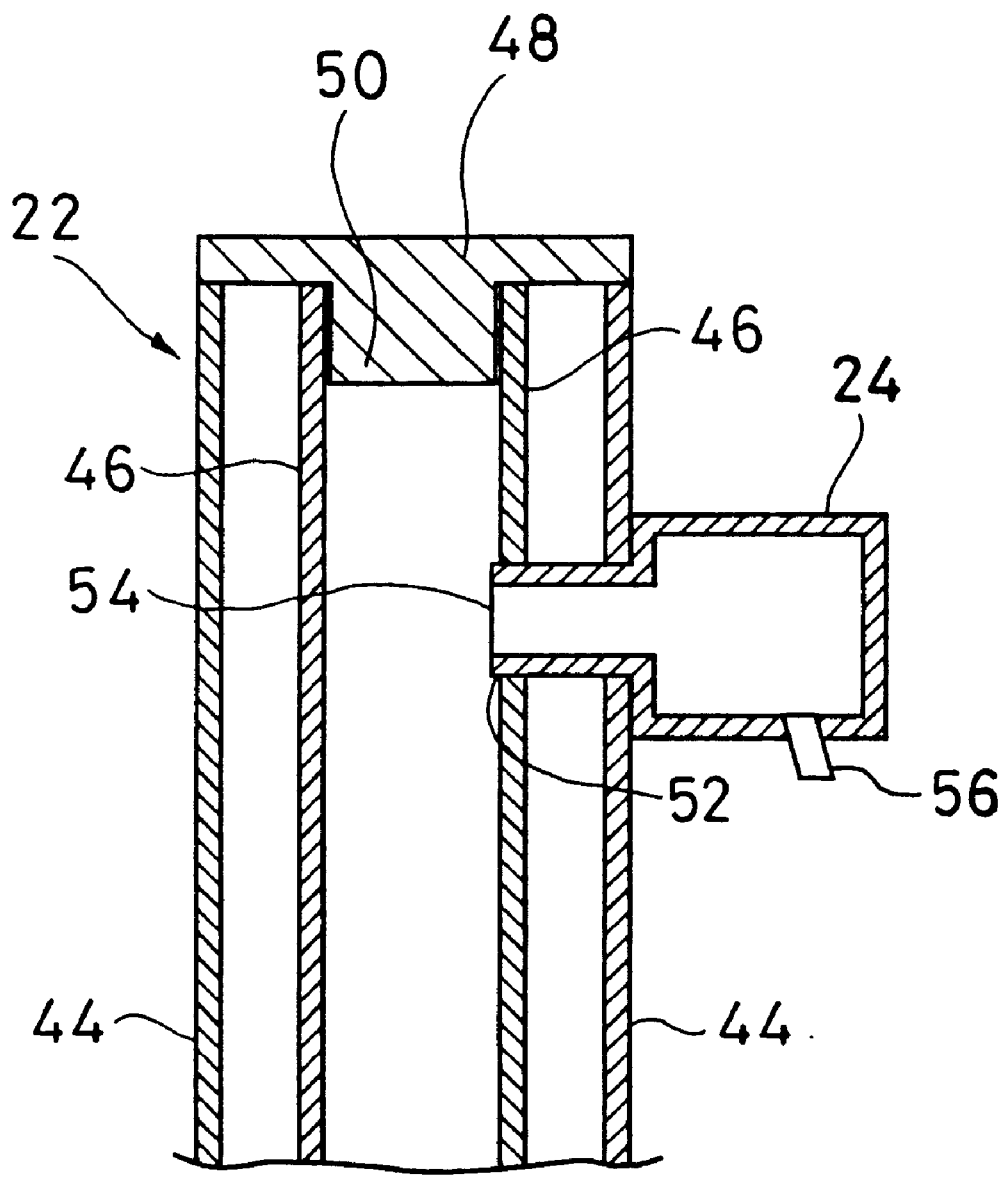
FIG. 13 is a schematic diagram of a sectional view of a structure of a conduit.

FIG. 13 shows a cross sectional structure of the conduit 22. The conduit 22 is composed of an outer pipe 44 made of copper or bronze, an aluminum pipe 46 inside the outer pipe 44, and a T-shaped cap 48 whose foot 50 is inserted into the aluminum pipe 46 on the end portion and welded to the outer pipe 44. Since the foot 50 of the cap 48 is fitted into the aluminum pipe 46, it helps to maintain a gap between the outer pipe 44 and the aluminum pipe 46. As shown in the drawing, for connecting of each conduit and the nozzle 24, an inside end rim 52 of the nozzle 24 is fitted or screwed into a hole 54 provided on the aluminum pipe 46, and is securely welded to the outer pipe 44. Incidentally, the designation 56 shows a jet hole in the figure.

As above explained, in the device for gas pressure welding relating to the present invention, a number-sign shaped flame is formed on an intersecting plane at the right angles with the gas pressure weld portion of the reinforcing steel, and since the number-sign shaped flames heat the gas pressure weld portion which is in an intersecting state, the flames do not only concentrate on the end face to be welded but also uniformly heat a certain area around the end face to be welded. So, it is not necessary to swing the nozzle itself along the axial direction of the reinforcing steel as required in the conventional heating process, and the heating can be stably carried out. And the device for gas pressure welding can be controlled by adjusting the fitting angle of the nozzles and supply quantity of gas and oxygen. Since the device for gas pressure welding of the present invention does not require oscillation of the nozzle itself, the gas welding can be performed while the nozzles are stationary being held by a nozzle supporting fixture. Therefore the present invention has plenty of excellent advantages that a worker can engage in other work because he is not required to hold the nozzle with his hands, because he is released from spiritual tension to some extent and so on.

What is claimed is:

1. A device for gas pressure welding comprising:
a plurality of nozzles arranged to constructively form a cube having a top surface plane parallel to a bottom surface plane and four side surface planes perpendicular and connected to the top and bottom surface planes, a nozzle of the plurality of nozzles being located at each lattice point of the cube, the cube surrounding a gas pressure weld portion of reinforcing steel at a center of the cube, the plurality of nozzles also being grouped into a plurality of pairs of nozzles having a first nozzle and a second nozzle located at point symmetric positions on the cube, where the first nozzle faces the second nozzle; and
nozzle tips provided to make flame center lines from each pair of nozzles of the plurality of pairs of nozzles parallel such that flames blown out from each nozzle along each flame center line maintains a center of the reinforcing steel therebetween to heat a gas welding portion of the reinforcing steel.

2. A device for gas pressure welding comprising:
a plurality of conduits arranged to surround a gas welding portion of a piece of reinforcing steel; and
nozzles provided at upper and bottom portions on said conduits, positioning said gas welding portion at a center relative to the plurality of conduits, adjusting a nozzle angle of the nozzles placed at point symmetric positions so that flames blown out from the nozzles intersect in a three dimensional shape near the center.

3. The device of gas pressure welding according to claim 1, wherein the reinforcing steel to be welded is placed at a center of a space surrounded by the flame center lines by setting extended center lines of jet holes arranged at point symmetric positions with each other in parallel a flame from the first nozzle does not directly heat the second nozzle for said each pair of nozzles on a diagonal line.

4. The device for gas pressure welding according to claim 1, wherein a plurality of conduits are arranged around the center of the cube to form the four side surface planes of the cube and a position of each nozzle tip is deviated from an extended line of the flame blown out from each nozzle so that the first nozzle is prevented from heating the second nozzle for said each pair of nozzles.

5. The device for gas pressure welding according to claim 2, wherein said conduits are bent away from the reinforcing steel such that the nozzles on the conduits are positioned at an equal distance from the surface of the reinforcing steel.

6. A device for gas pressure welding comprising:
four parallel conduits formed by intersecting a base portion of U-shaped conduits;
a nozzle provided at each of upper and bottom portions of each parallel conduit, such that one nozzle confronts with the other nozzle of each parallel conduit at a point symmetric position to form a pair of confronting nozzles; and
jet holes arranged in a manner such that flame center lines of each pair of the paired confronting nozzles form at least two pairs of parallel flames that intersect at a substantially right angles such that by placing a center of reinforcing steel at a middle of the intersecting pairs of parallel flames, a gas weld portion of the reinforcing steel is positioned near the parallel flames to be heated.

7. A device for gas pressure welding comprising:
a nozzle supporting fixture to be attached to a reinforcing steel, the fixture having a reinforcing steel hold fitting at one end portion, forming an L-shape, and having another reinforcing steel hold fitting to attach and release a flame nozzle at another end portion;
heating means having flame nozzles surrounding a gas weld portion of the reinforcing steel and having four parallel conduits formed by arranging bases of tuning fork shaped conduits in a cross;
a nozzle provided at each of upper and bottom portions of each parallel conduit, such that one nozzle confronts with the other nozzle of each parallel conduit at a point symmetric positions to form a pair of confronting nozzles; and
jet holes arranged in a manner such that flame center lines of each pair of the paired confronting nozzles form at least two pairs of parallel flames that intersect at substantially right angles such that a center of the reinforcing steel is placed at a middle of the intersecting parallel flames, so that the gas weld portion of the reinforcing steel can be positioned in the middle of the intersecting parallel flames by attaching the nozzle supporting fixture to the reinforcing steel.

8. The device for gas pressure welding according to claim 2, wherein said conduit is formed with a double pipe having an aluminum pipe inside.

9. The device for gas pressure welding according to claim 7, wherein a length adjusting portion is provided at some midpoint of said nozzle supporting fixture.

10. The device for gas pressure welding according to claim 7, wherein a vibration generating means is provided near where said heating means is attached on said nozzle supporting fixture.

* * * * *